United States Patent
Hara et al.

(10) Patent No.: US 12,206,551 B2
(45) Date of Patent: Jan. 21, 2025

(54) POWER CONTROL DEVICE, POWER CONTROL METHOD, AND POWER CONTROL PROGRAM

(71) Applicant: Nippon Telegraph and Telephone Corporation, Tokyo (JP)

(72) Inventors: Koichi Hara, Musashino (JP); Eriko Iwasa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/271,569

(22) PCT Filed: Jan. 12, 2021

(86) PCT No.: PCT/JP2021/000607
§ 371 (c)(1),
(2) Date: Jul. 10, 2023

(87) PCT Pub. No.: WO2022/153346
PCT Pub. Date: Jul. 21, 2022

(65) Prior Publication Data
US 2024/0137273 A1 Apr. 25, 2024
US 2024/0235934 A9 Jul. 11, 2024

(51) Int. Cl.
*H04L 41/0833* (2022.01)
*H02J 3/14* (2006.01)

(52) U.S. Cl.
CPC ............ *H04L 41/0833* (2013.01); *H02J 3/14* (2013.01)

(58) Field of Classification Search
None
See application file for complete search history.

(56) References Cited

U.S. PATENT DOCUMENTS

| | | | |
|---|---|---|---|
| 11,978,266 B2* | 5/2024 | Arar | G06V 20/588 |
| 2009/0235097 A1* | 9/2009 | Hamilton | G06F 1/3203 713/320 |
| 2010/0211810 A1* | 8/2010 | Zacho | G06F 1/3203 713/320 |
| 2011/0239010 A1 | 9/2011 | Jain et al. | |
| 2012/0204051 A1 | 8/2012 | Murakami et al. | |

(Continued)

FOREIGN PATENT DOCUMENTS

| | | |
|---|---|---|
| JP | 2011082799 | 4/2011 |
| JP | 2013524317 | 6/2013 |
| JP | 2015197892 | 11/2015 |

OTHER PUBLICATIONS

Goudarzi et al., "Geographical Load Balancing for Online Service Applications in Distributed Datacenters," Proceedings of the 2013 IEEE Sixth International Conference on Cloud Computing, Santa Clara, CA, USA, Jun. 28-Jul. 3, 2013, 351-358, 8 pages.

*Primary Examiner* — Phuoc H Nguyen
(74) *Attorney, Agent, or Firm* — Fish & Richardson P.C.

(57) ABSTRACT

A power control device includes a supply power prediction unit that determines excess or deficiency of a power supply state according to a power supply and demand situation for each server deployed in a data center that changes at least one of a total number of servers operating in the data center and a power setting of each server in operation so as to eliminate excess or deficiency of the power supply state. The power control unit further changes disposition on a server of a service program operating on each server depending on the power supply state.

7 Claims, 15 Drawing Sheets

(56) References Cited

U.S. PATENT DOCUMENTS

| | | | |
|---|---|---|---|
| 2013/0054987 A1* | 2/2013 | Pfeiffer | H02J 3/14 |
| | | | 713/300 |
| 2017/0192488 A1* | 7/2017 | Wu | G06F 1/3287 |
| 2017/0195408 A1* | 7/2017 | Wu | G06F 1/3203 |
| 2018/0052503 A1* | 2/2018 | Sharma | G06F 1/30 |
| 2019/0171276 A1* | 6/2019 | Lin | G06F 1/3287 |
| 2019/0370085 A1* | 12/2019 | Gross | G06F 1/3296 |

* cited by examiner

Fig. 4

| SERVER | CPU DESIGN | SERVER SETTING STATE | POWER SUPPLY | POWER CONSUMPTION |
|---|---|---|---|---|
| SA1 | HIGH-PERFORMANCE | PERFORMANCE | ON | 300 |
| SA2 | HIGH-PERFORMANCE | BALANCE | ON | 200 |
| SA3 | HIGH-PERFORMANCE | BALANCE | ON | 200 |
| SA4 | HIGH-PERFORMANCE | BALANCE | OFF | 0 |
| SB1 | LOW-POWER | MINIMUM | ON | 100 |
| SB2 | LOW-POWER | MINIMUM | ON | 100 |
| SB3 | LOW-POWER | MINIMUM | ON | 100 |
| SB4 | LOW-POWER | MINIMUM | OFF | 0 |
| SB5 | LOW-POWER | MINIMUM | OFF | 0 |

| SERVER | VM |
|---|---|
| SA1 | V01[150: VARIABLE 100 AND UP]+V02[150: VARIABLE 100 AND UP] |
| SA2 | V03[100: VARIABLE 100 AND UP]+V04[100: FIXED] |
| SA3 | V05[200: FIXED] |
| SA4 | |
| SB1 | V07[100: VARIABLE 100 AND UP: SHUTDOWN ALLOWED] |
| SB2 | V08[100: VARIABLE 100 AND UP] |
| SB3 | V09[100: FIXED] |
| SB4 | |
| SB5 | |

| SERVER | CPU DESIGN | SERVER SETTING STATE | POWER SUPPLY | POWER CONSUMPTION |
|---|---|---|---|---|
| SA1 | HIGH-PERFORMANCE | BALANCE | ON | 200 |
| SA2 | HIGH-PERFORMANCE | BALANCE | ON | 200 |
| SA3 | HIGH-PERFORMANCE | BALANCE | ON | 200 |
| SA4 | HIGH-PERFORMANCE | BALANCE | OFF | 0 |
| SB1 | LOW-POWER | MINIMUM | OFF | 0 |
| SB2 | LOW-POWER | MINIMUM | ON | 100 |
| SB3 | LOW-POWER | MINIMUM | ON | 100 |
| SB4 | LOW-POWER | MINIMUM | OFF | 0 |
| SB5 | LOW-POWER | MINIMUM | OFF | 0 |

Fig. 11

| STATE | POWER | CONDITION | ACTION |
|---|---|---|---|
| WHEN DEPLOYED | DEFICIENCY | C14 IS SATISFIED | A11 |
| | | C14 IS NOT SATISFIED | A12 |
| | | C11 AND C12 ARE SATISFIED | A13 |
| | | C11 AND C13 ARE SATISFIED | A14 |
| WHEN CONTROLLED | DEFICIENCY | C14 IS SATISFIED | A11 |
| | | C14 IS NOT SATISFIED | A12B |
| | | C11 AND C12 ARE SATISFIED | A13 |
| | | C11 AND C13 ARE SATISFIED | A14 |
| | EXCESS | C14C IS SATISFIED | A11C |
| | | C11C AND C12C ARE SATISFIED | A13C |
| | | C11C AND C13C ARE SATISFIED | A14C |

Fig. 12

| ID | CONDITION | | | | ACTION |
|---|---|---|---|---|---|
| | C11 | C12 | C13 | C14 | |
| L11 | NOT SATISFIED | | | SATISFIED | A11 |
| L12 | SATISFIED | NOT SATISFIED | NOT SATISFIED | SATISFIED | A11 |
| L13 | NOT SATISFIED | | | NOT SATISFIED | A12 |
| L14 | SATISFIED | NOT SATISFIED | NOT SATISFIED | NOT SATISFIED | A12 |
| L15 | SATISFIED | SATISFIED | | | A13 |
| L16 | SATISFIED | NOT SATISFIED | SATISFIED | | A14 |
| L17 | SATISFIED | SATISFIED | SATISFIED | SATISFIED | A11, A13, A14 |

Fig. 13

| ID | CONDITION | | | | ACTION |
|---|---|---|---|---|---|
| | C11 | C12 | C13 | C14 | |
| L21 | NOT SATISFIED | | | SATISFIED | A11 |
| L22 | SATISFIED | NOT SATISFIED | NOT SATISFIED | SATISFIED | A11 |
| L23 | NOT SATISFIED | | | NOT SATISFIED | A12B |
| L24 | SATISFIED | NOT SATISFIED | NOT SATISFIED | NOT SATISFIED | A12 |
| L25 | SATISFIED | SATISFIED | | | A13 |
| L26 | SATISFIED | NOT SATISFIED | SATISFIED | | A14 |
| L27 | SATISFIED | SATISFIED | SATISFIED | SATISFIED | A11, A13, A14 |

Fig. 14

| ID | CONDITION | | | | ACTION |
|---|---|---|---|---|---|
| | C11 | C12C | C13C | C14C | |
| L31 | NOT SATISFIED | | | SATISFIED | A11C |
| L32 | SATISFIED | NOT SATISFIED | NOT SATISFIED | SATISFIED | A11C |
| L33 | SATISFIED | SATISFIED | | | A13C |
| L34 | SATISFIED | NOT SATISFIED | SATISFIED | | A14C |
| L35 | SATISFIED | SATISFIED | SATISFIED | SATISFIED | A11C, A13C, A14C |

POWER CONTROL DEVICE, POWER CONTROL METHOD, AND POWER CONTROL PROGRAM

CROSS-REFERENCE TO RELATED APPLICATIONS

This application is a National Stage application under 35 U.S.C. § 371 of International Application No. PCT/JP2021/000607, having an International Filing Date of Jan. 12, 2021, the disclosure of which is considered part of the disclosure of this application, and is incorporated by reference in its entirety into this application.

TECHNICAL FIELD

The present invention relates to a power supply control device, a power supply control method, and a power supply control program.

BACKGROUND ART

A plurality of servers are deployed in a data center, and power is consumed by executing an application disposed on each server. In a case where renewable energy is utilized as a power generation facility that supplies power to the data center, the power supply may be unstable, causing some server to be in a power deficiency. Therefore, Non Patent Literature 1 describes that a server is operated by performing load distribution in a geographically dispersed data center.

CITATION LIST

Non Patent Literature

Non Patent Literature 1: H. Goudarzi et al, "Geographical Load Balancing for Online Service Applications in Distributed Datacenters", Published in: 2013 IEEE Sixth International Conference on Cloud Computing, [online], IEEE, [Retrieved on Dec. 25, 2020], the Internet <URL: https://ieeexplore.ieee.org/abstract/document/6676714>

SUMMARY OF INVENTION

Technical Problem

On the other hand, if such a geographically dispersed data center as described in Non Patent Literature 1 cannot be used, it is necessary to use normal power supply such as thermal power generation together or to prepare a sufficient power storage facility.

Therefore, considering the renewable energy as the main source of energy, the power generation method with a large deviation depending on time zone when the power can be generated requires an extremely large power storage facility in order to stabilize the power supply, and if such a power storage facility cannot be prepared enough, the energy is to be discarded.

Therefore, a main object of the present invention is to operate a server in a stable state while effectively utilizing supplied power even in an environment where unstable power supply is received.

Solution to Problem

In order to solve the above problem, a power supply control device of the present invention has the following features.

The present invention includes a determination unit that determines excess or deficiency of a power supply state according to a power supply and demand situation for each server deployed in a data center, and a control unit that changes at least one of a total number of servers operating in the data center and a power setting of each server in operation so as to eliminate excess or deficiency of the power supply state.

Advantageous Effects of Invention

According to the present invention, it is possible to stably operate a server while effectively utilizing supplied power even in an environment where power supply is unstable.

BRIEF DESCRIPTION OF DRAWINGS

FIG. 4 is a table illustrating a state before power control of each server constituting a data center according to the present embodiment.

FIG. 5 illustrates a state after power control with respect to the table in FIG. 4 according to the present embodiment.

FIG. 11 is a table illustrating conditions for executing each action of power control according to the present embodiment.

FIG. 12 is a table illustrating cases where each action of the processing of FIG. 7 is executed following the table in FIG. 11 according to the present embodiment.

FIG. 13 is a table illustrating cases where each action is executed in the power saving control processing according to the present embodiment.

FIG. 14 is a table illustrating cases where each action is executed in the performance control processing according to the present embodiment.

DESCRIPTION OF EMBODIMENTS

Hereinafter, the present embodiment will be described with reference to the drawings.

Figure 1:
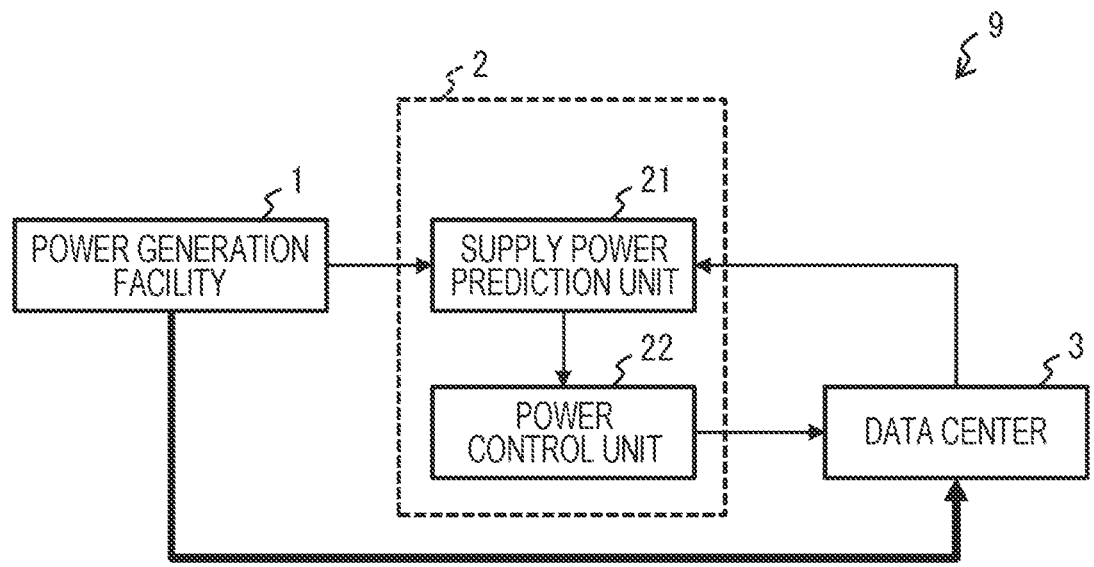
FIG. 1 is a configuration diagram of a data center system according to the present embodiment.

FIG. 1 is a configuration diagram of a data center system 9.

In the data center system 9, as indicated by thin arrows, a power generation facility 1, a power control device 2, and a data center 3 are connected by a network. In addition, the power generation facility 1 supplies power to the data center 3 as indicated by a thick line arrow.

The power generation facility 1 may be a conventional power generation facility in which the power supply amount can be controlled and stable, such as thermal power generation, or may be a power generation facility using renewable energy such as climate in which the power supply amount cannot be controlled, such as solar power generation. Hereinafter, a case of solar power generation will be exemplified in the present specification.

One or more servers are deployed in the data center 3, and each server provides various services by executing a program externally disposed.

Note that the service program executed on the server may be an application that can be executed as it is on a physical resource (bare metal) of the server, or may be middleware that provides an operation environment of the application as an intermediate layer between the server and the application. The middleware is, for example, a virtual machine (VM) and a container. Hereinafter, a case of the VM will be exemplified in the present specification.

The power control device 2 includes a supply power prediction unit (determination unit) 21 and a power control unit (control unit) 22.

The supply power prediction unit 21 predicts the supply power from the power generation facility 1 to the data center 3 per time unit (for example, for each hour). For example, in a case where the power generation facility 1 is solar power generation, the supply power is greatly affected by the solar radiation amount. Therefore, the supply power prediction unit 21 receives an input of weather forecast data such as "it is sunny now, but one hour later, it will rain", and predicts future supply power such as "the power supply amount will be 50% less than now".

Then, the supply power prediction unit 21 predicts excess or deficiency of the supply power from the power generation facility 1 to the data center 3 per time unit (for example, for each hour). Therefore, the supply power prediction unit 21 compares the predicted value of the supply power with an actual measurement value of the power consumption obtained by monitoring the power consumption of the server operating in the data center 3, thereby obtaining excess or deficiency of the supply power.

Alternatively, the supply power prediction unit 21 may receive input data from an external system that specifies excess or deficiency of the supply power per time unit (for example, for each hour).

Figure 2:
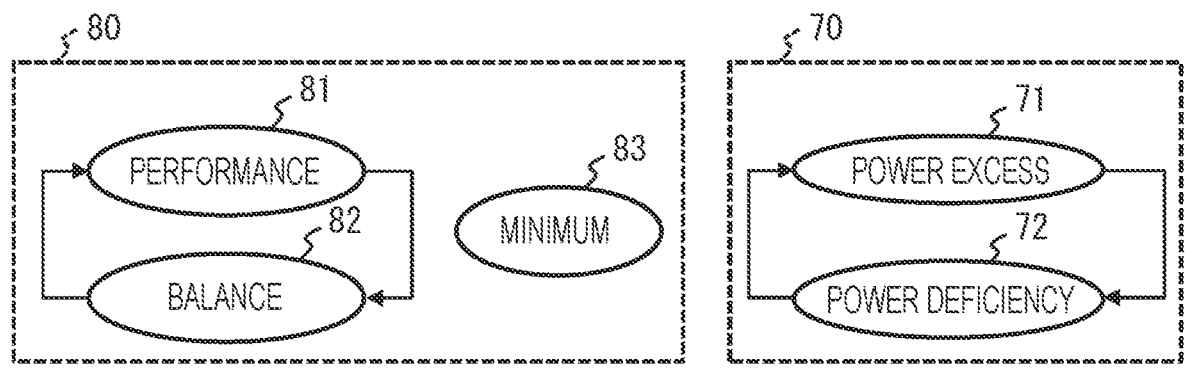
FIG. 2 is a state transition diagram regarding power control according to the present embodiment.

FIG. 2 is a state transition diagram regarding power control.

A power supply state 70 indicates a power excess 71 or a power deficiency 72 as a state of excess or deficiency of the supply power from the power generation facility 1 to the data center 3.

The power control unit 22 executes power control to each server of the data center 3 according to the power supply state 70 which is the output data from the supply power prediction unit 21 so as to eliminate the excess or deficiency.

A server setting state 80 is a power state defined for each server of the data center 3, and state transition can be performed by setting a basic input/output system (BIOS) such as CPU setting.

Performance 81 is one of the server settings and is set to maximize performance by consuming more power although power efficiency (performance/watt) is poor.

Balance 82 is also set to power consumption and performance slightly lower than the performance 81 to improve power efficiency.

Minimum 83 will be described as not transitioning to another setting, for example. The minimum 83 has power consumption and performance even lower than the balance 82 and improves power efficiency instead.

Therefore, as exemplified below, the server has a different power consumption performance ratio depending on the design characteristics of an installed CPU.

By operating a server with a high-performance CPU design that emphasizes maximum performance (hereinafter referred to as "high-performance server") as the performance 81, power consumption and maximum performance can be increased, but power efficiency is reduced.

By operating a server with a low-power CPU design that emphasizes power efficiency (hereinafter referred to as a "low-power server") as the minimum 83, power consumption and performance are low, but power efficiency can be increased.

As described above, the data center 3 may be constructed as an environment (heterogeneous) in which a plurality of types of server sets having different properties of computer machines are mixed. Note that the properties of computer machines are defined by, for example, design characteristics of the CPU that determine performance and power efficiency. On the other hand, the data center 3 may be constructed by a server set having the same property.

Returning to FIG. 1, the power control unit 22 executes at least one of the following power controls exemplified as first to fourth controls according to the power supply state 70. As a result, it is possible to maximize the available power while balancing the power demand.

[First control] changes the total number of servers operating. In the power deficiency 72, the number of servers operating is reduced, and in the power excess 71, the number of servers operating is increased.

[Second control] changes the performance setting of each server operating. For example, in the power deficiency 72, the performance 81 is changed to the balance 82, and in the power excess 71, the balance 82 is changed to the performance 81. Alternatively, the type of the server may be changed without changing the total number of servers operating. For example, in the power deficiency 72, many low-power servers are operated, and in the power excess 71, many high-performance servers are operated.

[Third control] changes the destination where the VM is disposed (for details, see FIG. 4). For example, in the power deficiency 72, a server with higher power efficiency is redisposed, and in the power excess 71, the server with higher power consumption is redisposed.

[Fourth control] changes the operation/non-operation of the VM operating in the server (for details, see FIG. 4). In the power deficiency 72, the number of VMs operating is reduced, and in the power excess 71, the number of VMs operating is increased.

Figure 3:
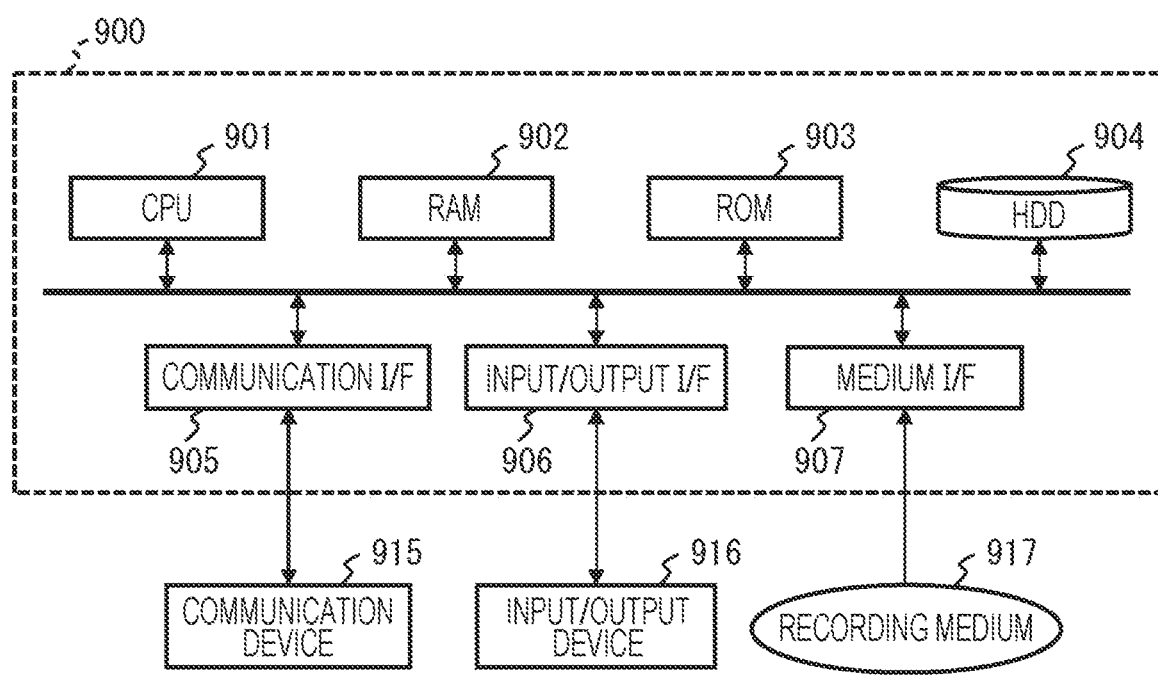
FIG. 3 is a hardware configuration diagram of a power control device according to the present embodiment.

FIG. 3 is a hardware configuration diagram of the power control device 2.

The power control device 2 is configured as a computer 900 including a CPU 901, a RAM 902, a ROM 903, an HDD 904, a communication I/F 905, an input/output I/F 906, and a medium I/F 907.

The communication I/F 905 is connected to an external communication device 915. The input/output I/F 906 is connected to an input/output device 916. The medium I/F 907 reads and writes data from and to a recording medium 917. Furthermore, the CPU 901 controls each processing unit by executing a program (a power supply control program and the like installed in the supply power prediction unit 21, the power control unit 22, and the power control device 2) read into the RAM 902. Then, the program can be distributed via a communication line or recorded in a recording medium 917 such as a CD-ROM and distributed.

FIG. 4 is a table illustrating a state before power control of each server constituting the data center 3.

A table 101 indicates a hardware state of the data center 3 before the power control.

In the data center 3, four high-performance servers (SA1 to SA4) and five low-power servers (SB1 to SB5) are deployed, and among them, six servers are in operation with power on. In addition, even in the same state of power-on, the high-performance server with the performance 81 setting consumes 300 [W] of power, which is more power than the high-performance server with the balance 82 setting consumes 200 [W] of power.

A table 102 indicates a software state of the data center 3 before the power control.

For example, two VMs V01 and V02 are disposed in the server SA1. Note that a request label is attached to each VM. For example, the request label [150: variable 100 and up] on V01 indicates that power of 150 [W] may be set as required performance, and the required performance may be variable within a range of 100 [W] or more.

The request label of the VM indicates parameters to be set for requesting an orchestrator (such as Kubernetes/OpenStack) of the VM to generate the VM. Hereinafter, as an example of the request label, a performance variation label and a priority label will be described.

The performance variation label is a label that specifies whether or not variation in required performance of the VM is allowed. The required performance is defined by the required number of cores of the CPU, the required memory usage, the required specification (model number) of the GPU, and the like.

The performance variation label "fixed" is specified in a case where variation in required performance is not allowed and the same performance is continuously requested as a service level agreement (SLA).

The performance variation label "variable" is specified in a case where variation in required performance is allowed, and although there is a lower limit of required performance, an increase in performance is also allowed. For example, even in a case where performance of video processing (resolution or the like) is changed as in video distribution, if the processing is established as a service, or if that is batch processing in which a predetermined total amount of processing is performed but an execution time is not limited, "variable" is specified.

The priority label is referred to for determining whether or not to be preferentially operated in the entire system of the plurality of types of VMs over other VMs and whether or not to be operated preferentially allocating higher server performance than other VMs.

The priority label takes, for example, any integer of 0 to 3, and as the numerical value is larger, the VM is operated in preference to other VMs. Note that the priority label "0" allows that there is a period to be stopped without being operated ("shutdown allowed" in SB1 in FIG. 4), and is assigned in a case where a continuous operation like batch processing is not required.

FIG. 5 illustrates a state after power control with respect to the table in FIG. 4. Table 103 illustrates a case where the power deficiency 72 in FIG. 4 is eliminated in FIG. 5.

The power control unit 22 saves power by reducing the number of VMs operating. Therefore, the power control unit 22 shuts down V07 on the server SB1 and then turns off the power of the server SB1. This saves 100 [W] of power.

Further, since both the performance variation labels V01 and V02 are "variable", the power control unit 22 saves power of 100 [W] by changing the performance setting of the server SA1 from the performance 81 to the balance 82.

Figure 6:
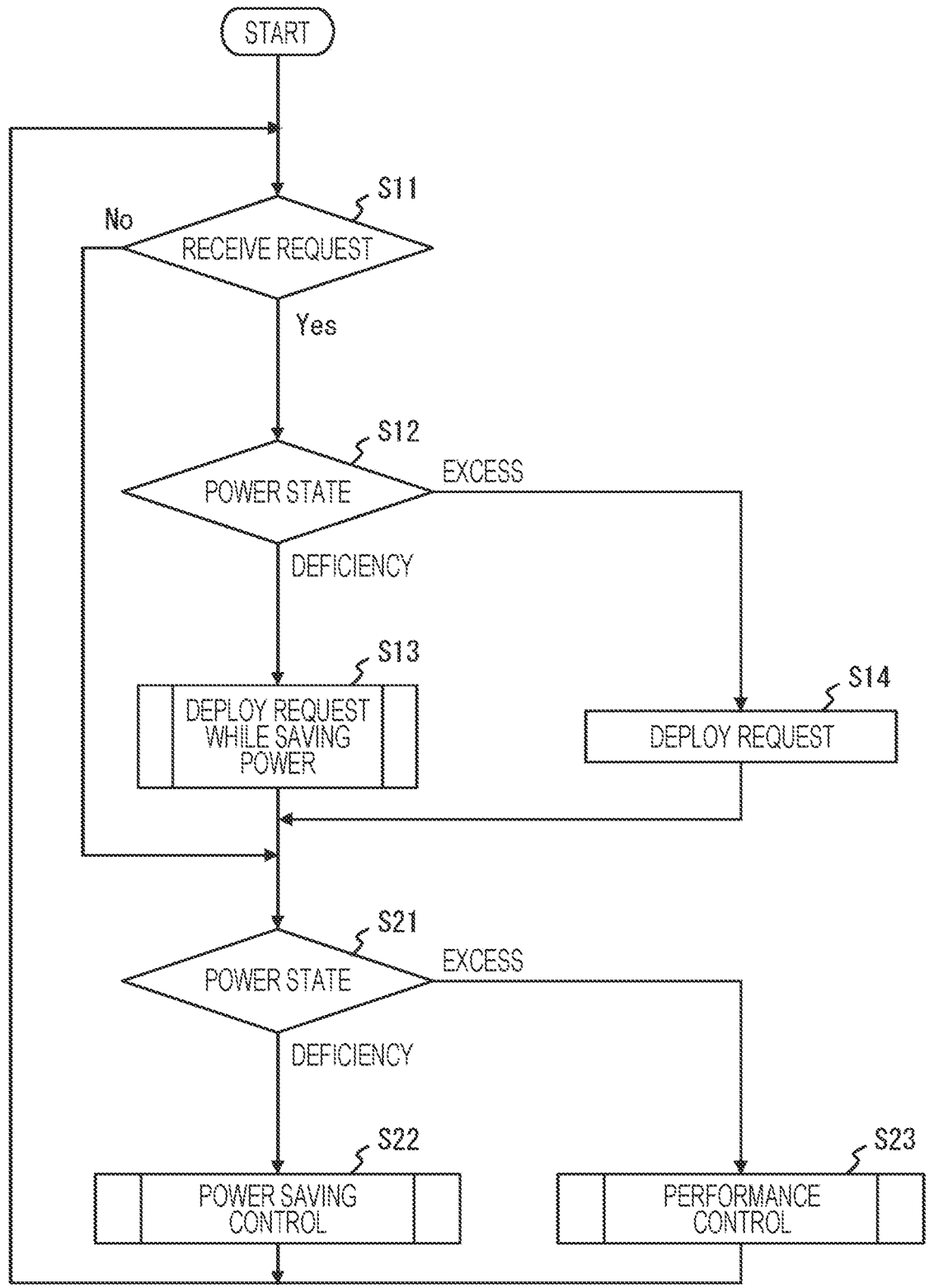
FIG. 6 is a flowchart illustrating an overview of processing of the power control device according to the present embodiment.

FIG. 6 is a flowchart illustrating an overview of processing of the power control device 2.

The power control unit 22 determines whether or not a request for deploying the VM on the server has been received from an external system (S11). If Yes in S11, the process proceeds to S12, and if No, the process proceeds to S21.

The supply power prediction unit 21 branches processes on the basis of the current or near future power supply state 70 (S12). If the power excess 71 in S12, the process proceeds to S14, and if the power deficiency 72, the process proceeds to S13.

The power control unit 22 deploys the VM of the request received in S11 in the server of the data center 3 (S14). Here, selection criteria of the server to be deployed are as follows.

(Criterion 1) A server that can operate the required performance described in a request label of a VM. For example, in a case where the VM specifies the required performance of 70 [W], a server having power consumption surplus of 70 [W] or more is selected. For example, it is assumed that the power consumption of the server A is 500 [W] in total and the power consumption of another VM currently operating is 100+200+150=450 [W] in total. At this time, the server A can consume the remaining 50 [W], but is not selected due to insufficient surplus for the required performance of 70 [W].

(Criterion 2) Among the server sets satisfying the criterion 1, the server is selected such that the performance variation label of the VM already in operation and the performance variation label of the VM of the request received in the present S11 are the same as much as possible (so as to increase the ratio of being the same). As a result, as in the server SA1 of FIGS. 4 and 5, the performance variation labels of the VM set operating on the same server are prepared, so that the performance setting of the server can be easily changed, and the effect of the change is increased.

In addition, (Criterion 1) is essential, but (Criterion 2) is optional.

On the other hand, the process of deploying the request while saving power (S13) is basically the same as S14, but currently, there is no server satisfying (Criterion 1) due to the power deficiency 72. Therefore, before the VM of the request is deployed, control to save power in the entire data center 3 is performed (see FIG. 7 for details).

In a state where there is no VM of the request, the supply power prediction unit 21 branches processes on the basis of the power supply state 70 as in S12 (S21). If the power excess 71 in S21, the process proceeds to S23 to perform performance control for increasing power consumption (see FIG. 10 for details), and if the power deficiency 72, the process proceeds to S22 to perform power saving control for reducing power consumption (see FIGS. 8 and 9 for details).

Figure 7:
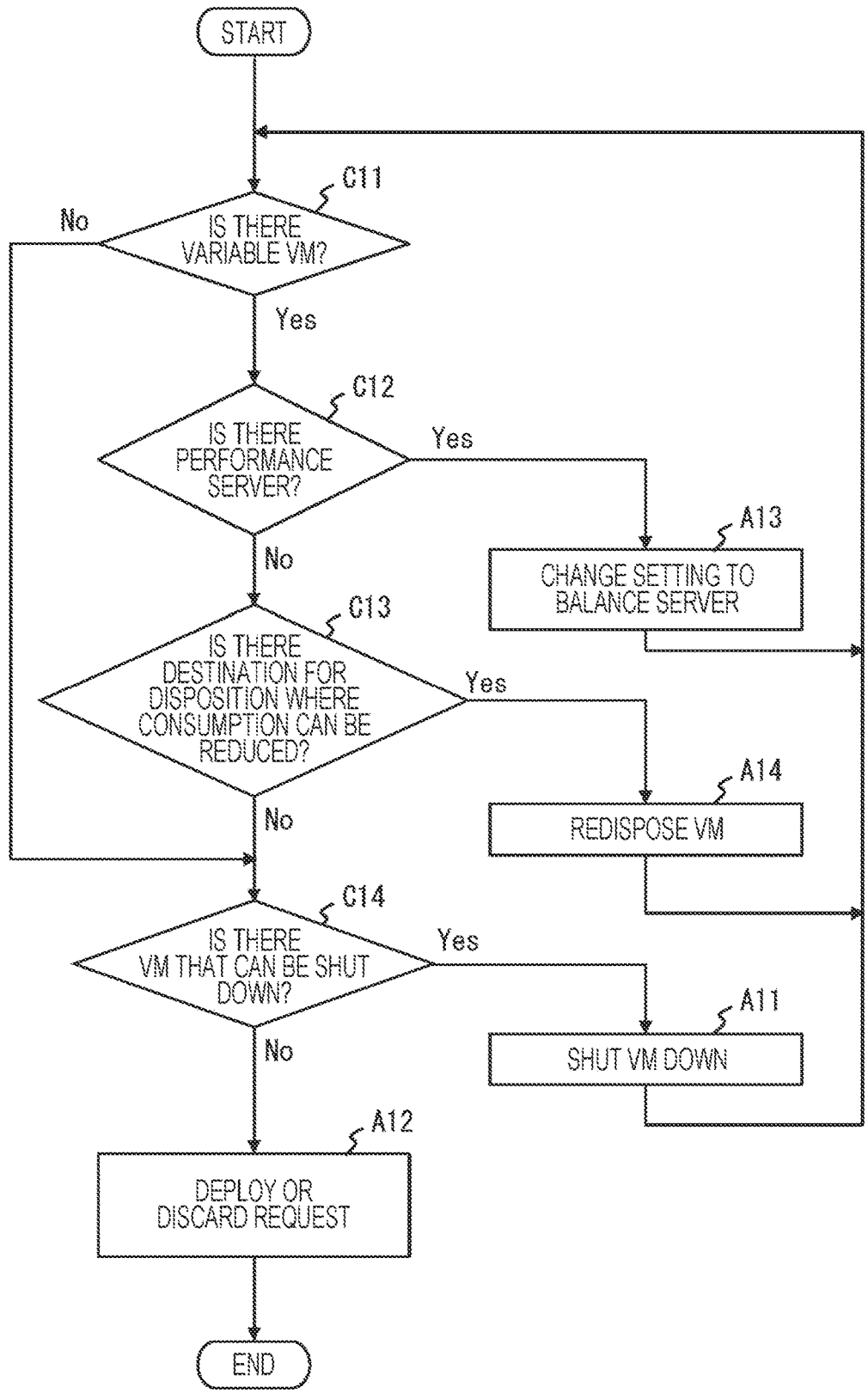
FIG. 7 is a flowchart illustrating details of processing of deploying a request while saving power according to the present embodiment.

FIG. 7 is a flowchart illustrating details of process of deploying a request while saving power (S13). If the VM specifies the required performance of 70 [W] on the basis of the process of FIG. 7, the VM is deployed after preparing the surplus for the server of 70 [W].

Hereinafter, for the first character of the code used in the flowchart, processing starting with "C" indicates a condition (C of condition), and process starting with "A" indicates power control (A of Action).

The power control unit 22 determines whether or not there is a VM with the performance variation label of "variable" (C11), and determines whether or not there is a server with the performance setting of performance 81 (C12). If (Yes in C11) and (Yes in C12), the power control unit 22 saves power by changing the setting of the server with the performance 81 to the balance 82 (A13).

When there are a plurality of servers whose setting is likely to be changed in A13, the setting may be changed in the order from the lowest total value of the priority labels of the operating VMs. Alternatively, if the total values of the priority labels is same, the setting may be changed by randomly selecting a server.

The power control unit 22 determines whether the power consumption of the VM that has been already disposed can be reduced in another destination where the VM is disposed than in the current destination and there is the power consumption surplus to deploy the VM in the other destination or not (C13). If (Yes in C11), (No in C12), and (Yes in C13), the power control unit 22 redisposes the VM to another destination having higher power efficiency than the current destination, thereby saving power (A14). If there is a plurality of VMs likely to be redisposed in A14, for example, the VM is randomly selected.

On the other hand, if (No in C11) or (No in C13), the process proceeds to C14.

The power control unit 22 determines whether or not there is a VM with a label (priority label=0) that can be shut down (stopped) (C14). The power control unit 22 randomly selects one target VM (Yes in C14) and shuts the target VM down to reduce power consumption (A11).

If (No in C14), and if there is a server that satisfies the required performance of the requested VM, the power control unit 22 may deploy the VM, or if there is no server, the power control unit 22 may discard the request (A12).

Figure 8:
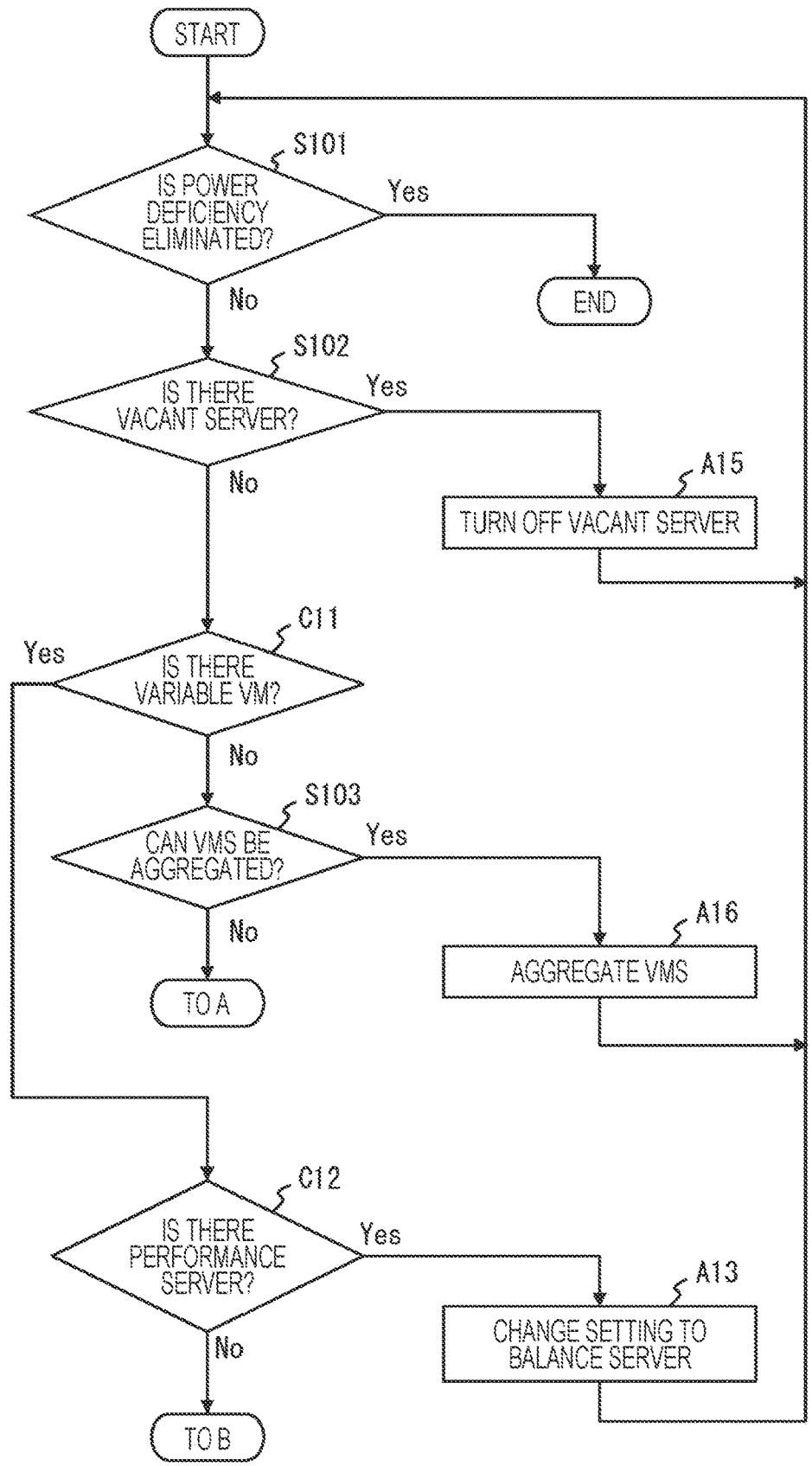
FIG. 8 is a flowchart illustrating a first half of power saving control processing according to the present embodiment.

FIG. 8 is a flowchart illustrating a first half of power saving control processing (S22).

Figure 9:
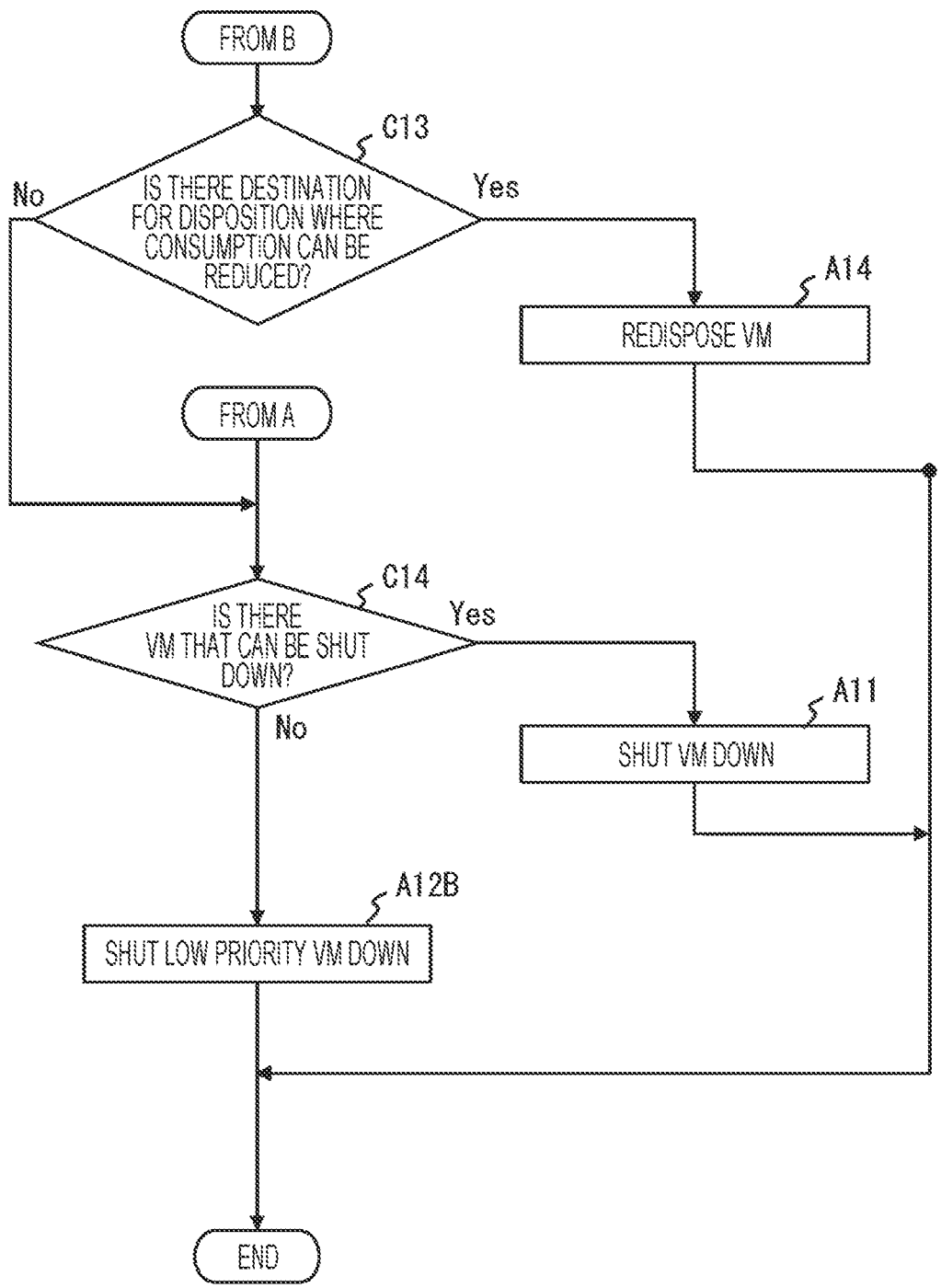
FIG. 9 is a flowchart illustrating a second half of power saving control processing according to the present embodiment.

FIG. 9 is a flowchart illustrating a second half of power saving control processing (S22). Hereinafter, the processes C11 to C14 starting with "C" and the processes A11 to A14 starting with "A" used in FIGS. 8 and 9 are as described with reference to FIG. 7.

The power control unit 22 determines whether or not the power deficiency 72 has been eliminated (S101). If Yes in S101, the process S22 ends, and if No, the process proceeds to S102.

If there is a vacant server on which the VM is not operating (Yes in S102), the power control unit 22 turns off the vacant server to save power (A15). If there is a plurality of servers likely to be a vacant server of A15, for example, the vacant server with the largest power consumption is turned off.

The power control unit 22 proceeds to C11 if (No in S102), proceeds to C12 if Yes in the determination of C11, and starts the process A13 similarly to FIG. 7 if (Yes in C12). If No in the determination of C11, the process proceeds to S103.

If the VMs can be aggregated in another server by redisposing the VMs in operation on the other server (Yes in S103), the power control unit 22 aggregates the VMs in the other server (A16). As a result, the server originated redisposing becomes a vacant server, so that the server is subjected to be turned off in the next S102. Note that the server originated redisposing is preferably a server having a small number of VMs disposed.

In addition, if (No in S103), the process proceeds from a connector A to C14 in FIG. 9, and if (No in C12), the process proceeds from a connector B to C13 in FIG. 9.

The power control unit 22 performs the determination processing of C13 from the connector B in FIG. 9, and if Yes in C13, performs processing of A14. The power control unit 22 performs the determination processing of C14 if the connector A or (No in C13), and performs processing of A11 if Yes in C14.

If (No in C14), the processing of A12 is performed in FIG. 7, however, it is replaced with processing of A12B in FIG. 9.

The power control unit 22 sequentially shuts down (stops) the VM in operation in ascending order of the priority label of the VM and in ascending order of the operating state such as the CPU usage rate until the power deficiency 72 is eliminated, thereby saving power (A12B).

Figure 10:
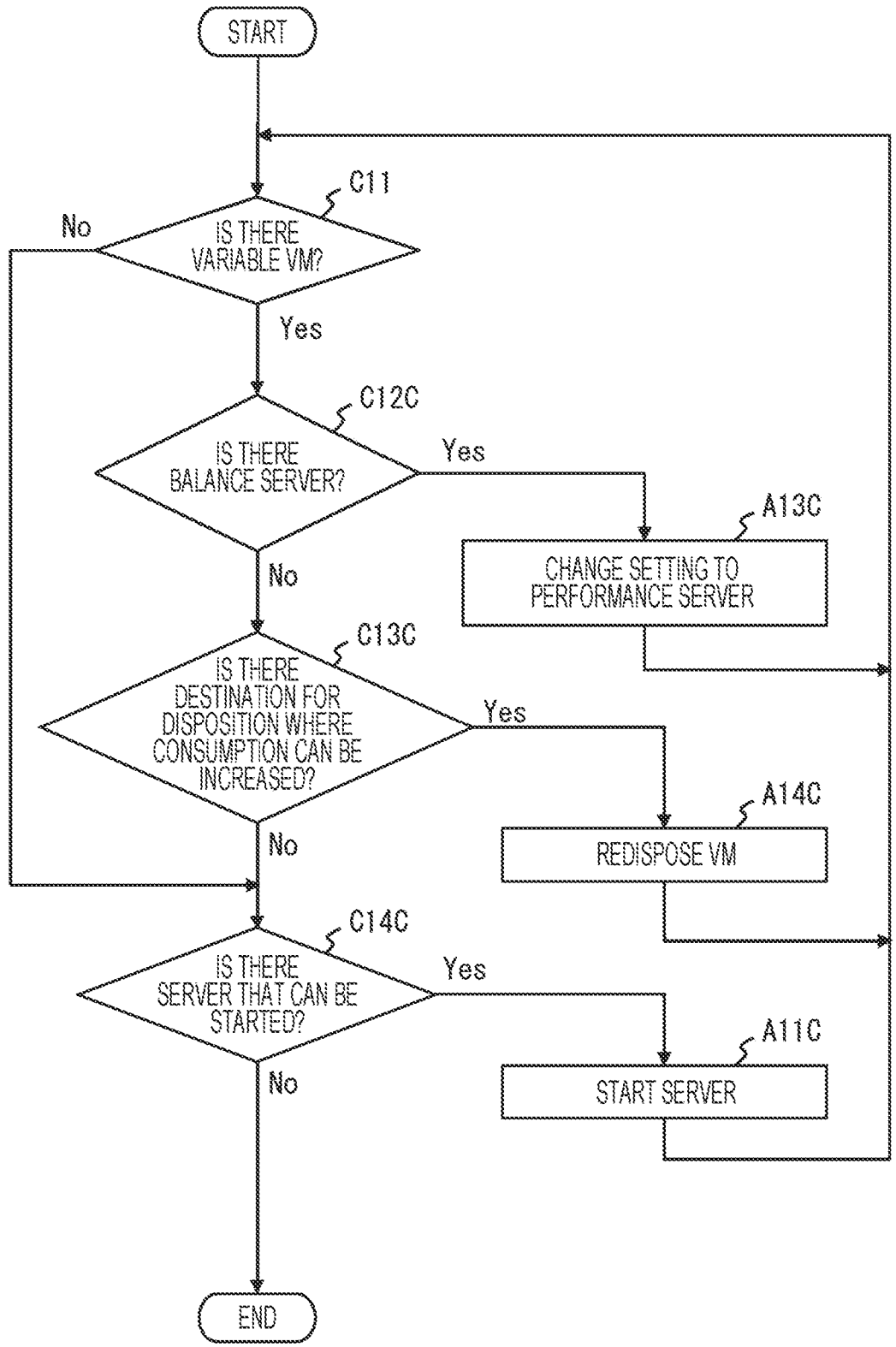
FIG. 10 is a flowchart illustrating performance control processing according to the present embodiment.

FIG. 10 is a flowchart illustrating performance control processing (S23).

Although FIGS. 7 to 9 illustrate the control to save the power for eliminating the power deficiency 72, since the power excess 71 is exists in FIG. 10, the power consumption is increased to perform the control to improve the processing performance of the VM.

The power control unit 22 determines whether or not there is a VM with the performance variation label of "variable" (C11), and determines whether or not there is a server with the performance setting of balance 82 (C12C). If (Yes in C11) and (Yes in C12C), the power control unit 22 increases the power consumption (A13C) by changing the setting of the server from the balance 82 to the performance 81.

If (No in C12C), the power control unit 22 determines whether the power consumption of the VM that has been already disposed can be increased in another destination where the VM is disposed than in the current destination and there is the power consumption surplus to deploy the VM in the other destination or not (C13C). If (Yes in C11), (No in C12C), and (Yes in C13C), the power control unit 22 redisposes the VM to another destination having more power consumption than the current destination, thereby improving performance of the VM (A14C).

On the other hand, if (No in C11) or (No in C13C), the process proceeds to C14C.

The power control unit 22 determines whether or not there is a server that is currently stopped but can be started within the range of the surplus power of the data center 3 (C14C). The power control unit 22 randomly selects one server to result in (Yes in C14) and starts the server to increase power consumption (A11C). Further, the power control unit 22 may start a new VM on a new server in accordance with the start of the new server.

If (No in C14C), the process of S23 is ended.

As described above, the respective actions A11 to A14 of power saving and the respective actions A11C to A14C of power increase are executed when a predetermined condition such as C11 is satisfied. Hereinafter, in FIGS. 11 to 14, the relationship between the conditions and the actions will be organized.

FIG. 11 is a table illustrating conditions for executing each action of power control.

The row of the state "when deployed" and the power "deficiency" in the table corresponds to the process (S13) in FIG. 7.

The row of the state "when controlled" and the power "deficiency" in the table corresponds to the process (S22) in FIGS. 8 and 9.

The row of the state "when controlled" and the power "excess" in the table corresponds to the process (S23) in FIG. 10.

For example, FIG. 7 illustrates the following two cases as conditions for executing the action A11.

Case of (No in C11) and (Yes in C14)
(Yes in C11) and (No in C12) and (No in C13) and (Yes in C14)

On the other hand, in the table of FIG. 11, only a condition that C14 is satisfied (Yes in C14) is described as a condition for executing the action A11. That is, regardless of the determination results of C11, C12, and C13, if (Yes in C14), the action A11 is executed.

FIG. 12 is a table illustrating cases where each action of the processing of FIG. 7 (S13) is executed following the table in FIG. 11.

In this table, for each of the rows L11 to L17 indicated by ID, individual determination results as to whether or not each condition is satisfied are associated with actions that can be derived from these determination results by the table of FIG. 11. In addition, a blank cell in the condition indicates that it is not determined whether or not the condition is satisfied.

For example, in the row L11, since it is a case of (C11 is not satisfied) and (C14 is satisfied), the action A11 is executed according to the rule in the first row of the table in FIG. 11.

On the other hand, in the row L17, since all the conditions of C11 to C14 are satisfied, the actions A11, A13, and A14 are executed according to the rules in the 1st, 3rd, and 4th rows of the table of FIG. 11. That is, as a case of satisfying the action A11, there are cases of the row L11 and the row L17.

FIG. 13 is a table illustrating cases where each action is executed in the power saving control processing (S22).

Since both FIG. 12 and FIG. 13 are common in terms of power saving control for the power deficiency 72, the actions of FIG. 12 and the actions of FIG. 13 are activated under substantially the same condition.

On the other hand, since there is no request in FIG. 13, the action A12 of discarding the request is replaced with an action A12B of stopping the VM in operation.

FIG. 14 is a table illustrating cases where each action is executed in the performance control processing (S23).

For example, in the row L31, since it is a case of (C11 is not satisfied) and (C14C is satisfied), the action A11C is executed according to the rule in the 9th row of the table in FIG. 11.

On the other hand, in the row L35, since all the conditions of C11 to C14C are satisfied, the actions A11C, A13C, and A14C are executed according to the rules in the 9th to 11th rows of the table of FIG. 11.

In this manner, various actions are executed by a combination of conditions according to the rule of the table in FIG. 11.

Figure 15:
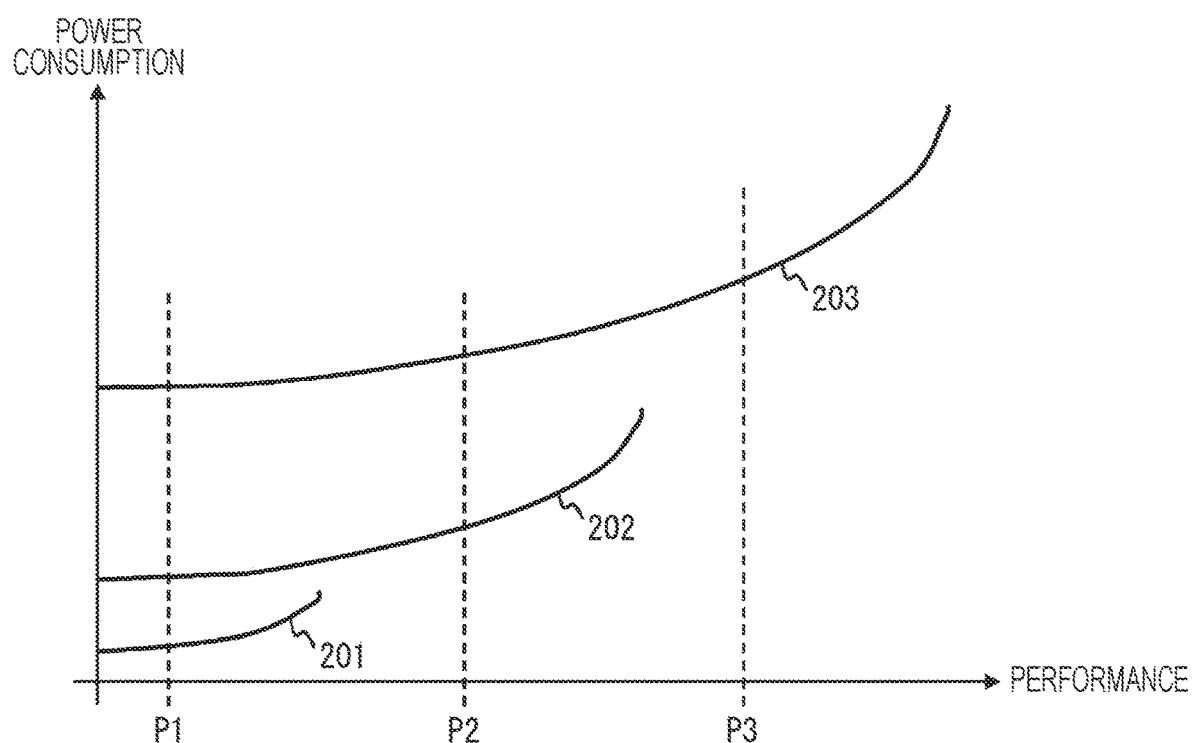
FIG. 15 is a graph illustrating a relationship between power consumption and performance according to the present embodiment.

FIG. 15 is a graph illustrating a relationship between power consumption and performance. The horizontal axis of the graph indicates the performance to be provided to the VM, and the vertical axis of the graph indicates the power consumption of the VM.

Each of the three curves corresponds to the server setting state 80. A curve 201 indicates the state of the minimum 83, a curve 202 indicates the state of the balance 82, and a curve 203 indicates the state of the performance 81.

In addition, three types of VMs operating on the server are illustrated. Since the first VM requires only the low required performance P1, the first VM operates in the minimum 83, the balance 82, or the performance 81. The power consumption required to provide the same performance is the lowest for the minimum 83, followed by the balance 82, and the performance 81 consumes more power.

Therefore, it is desirable to operate the first VM with the server of the minimum 83 with the best power efficiency. For example, in a case where the first VM is operating in the server of the balance 82 in the determination C13 of FIG. 7, (Yes in C13) is obtained. Therefore, by redisposing the first VM in the server of the minimum 83 (A14), the power control unit 22 can save power while providing the same performance to the first VM before and after the redisposition.

On the other hand, since the second VM has the moderate required performance P2, the second VM cannot operate in the minimum 83 due to insufficient performance. Therefore, the destination where the second VM is disposed is the server of the balance 82 or the server of the performance 81, and the server of the balance 82 has better power efficiency. In addition, in the server of the balance 82, as the CPU usage rate decreases, the CPU clock decreases and the power consumption also decreases.

Further, since the third VM has high required performance P3, the third VM cannot operate even in the minimum 83 or the balance 82 due to insufficient performance. Therefore, the destination where the third VM is disposed is limited to the server of the performance 81. Therefore, in the case of the power excess 71, the server of the performance 81 is increased by the action A13C of FIG. 10, and thus, the satisfaction level of the service to be provided can be increased by operating the third VM.

As described above, the power control unit 22 flexibly uses the policy giving priority to power efficiency and the policy giving priority to absolute performance according to the state of power supply and demand.

In addition, when there are a plurality of action options for performing power control, such as in the case of the row L17 in FIG. 12, the power control unit 22 may determine the order of the actions to be executed according to any one of the policies exemplified below.

(Policy 1) In order of lighter cost (load) of action. For example, in the order of A15→A13→A11→A12→A14, A16. As a result, although the power reduction range is small, the power reduction can be executed in a short time.

(Policy 2) In ascending order of influence on service (for example, service stop time). For example, the first control, the second control, the third control, and the fourth control described above are performed in this order, that is, A15→A13→A14, A16→A11→A12. As a result, the influence on the service currently executed can be minimized. The policy 2 is a general policy for operation.

(Policy 3) In descending order of power saving effect. For example, in the order of A15→A13, A14, A16→A11, A12. As a result, power reduction can be performed in a short time with a large reduction range. The policy 3 is used in a situation where the highest priority is placed on power reduction, such as a case where the available power is rapidly reduced due to a disaster or the like and cannot meet the demand, or a case where a trouble is expected in the entire system.

Note that the priority of A16 depends on the number of redisposition targets.

Here, the order of "A→B, C→D" described in each policy is as follows.

The action A is performed with the highest priority (symbol "A→B" means that A is prioritized over B). As a result, when the power deficiency is eliminated, the execution of the actions B, C, and D is omitted.

If the power deficiency is not eliminated even in the action A, the action B or the action C is executed with the same priority (symbol "B, C" means that B and C have the same priority).

If the power deficiency is not yet eliminated, the action D is executed.

Effects

A power control device 2 of the present invention includes a supply power prediction unit 21 that determines excess or deficiency of a power supply state 70 according to a power supply and demand situation for each server deployed in a data center 3, and a power control unit 22 that changes at least one of a total number of servers operating in the data center 3 and a power setting of each server in operation so as to eliminate excess or deficiency of the power supply state 70.

As a result, even in an environment where unstable power supply is received, each server of the data center 3 can effectively utilize the power supplied. Further, each server of the data center 3 operates stably without power deficiency.

The present invention includes the power control unit 22 further changes disposition on a server of a service program operating on each server depending on the power supply state 70.

As a result, even in an environment where unstable power supply is received, it is possible to supply a service without increasing or decreasing the operating service program.

In the present invention, when the power supply state 70 is in a state of power excess 71, the power control unit 22 executes at least one of a first control of increasing a total number of servers operating in the data center 3, a second control of increasing power consumption as a power setting of each server in operation, a third control of redisposing the service program operating on a predetermined server to a server having higher power consumption than the predetermined server, and a fourth control of increasing the service program operating on a server.

As a result, the performance of the service program can be improved by effectively utilizing the surplus power.

In the present invention, when the power supply state 70 is in a state of power deficiency 72, the power control unit 22 executes at least one of a first control of decreasing a total number of servers operating in the data center 3, a second control of decreasing power consumption as a power setting of each server in operation, a third control of redisposing the service program operating on a predetermined server to a server having higher power efficiency than the predetermined server, and a fourth control of decreasing the service program operating on a server.

As a result, power can be saved and the operation of the service program can be stabilized.

In the present invention, the power control unit 22 executes control in the order of the first control, the second control, the third control, and the fourth control until the power deficiency 72 is eliminated.

As a result, power control is performed in ascending order of influence on the service (for example, service stop time). Therefore, the influence on the service currently executed can be minimized.

REFERENCE SIGNS LIST

1 Power generation facility
2 Power control device
3 Data center
9 Data center system
21 Supply power prediction unit (determination unit)
22 Power control unit (control unit)
70 Power supply state
71 Power excess (state of power excess)
72 Power deficiency (state of power deficiency)
80 Server setting state
81 Performance
82 Balance
83 Minimum

The invention claimed is:

1. A power control device comprising a processor configured to perform operations comprising:
   determining a predicted level of supply power that will be provided by a power supply;
   comparing the predicted level of supply power to an actual measurement value of power consumption of one or more servers;
   determining a difference between the predicted level of supply power and the actual measurement value based on the comparing; and
   changing a level of actual power consumption by the one or more servers based on the difference, wherein the level of actual power consumption is reduced when the difference indicates that the actual measurement value is greater than the predicted level of supply power, and the level of actual power consumption is increased when the difference indicates that the actual measurement value is less than the predicted level of supply power, so as to reduce the difference.

2. The power control device according to claim 1, wherein the processor is further configured to perform operations comprising:
   changing disposition on a server of a service program operating on each server depending on a power supply state.

3. The power control device according to claim 2, wherein the processor is further configured to perform operations comprising:
   when the power supply state is in a state of power excess, executing at least one of a first control of increasing a total number of servers operating in a data center, a second control of increasing power consumption as a power setting of each server in operation, a third control of redisposing the service program operating on a predetermined server to a server having higher power consumption than the predetermined server, and a fourth control of increasing the service program operating on a server.

4. The power control device according to claim 2, wherein the processor is further configured to perform operations comprising:
   when the power supply state is in a state of power deficiency, executing at least one of a first control of decreasing a total number of servers operating in a data center, a second control of decreasing power consumption as a power setting of each server in operation, a third control of redisposing the service program operating on a predetermined server to a server having higher power efficiency than the predetermined server, and a fourth control of decreasing the service program operating on a server.

5. The power control device according to claim 4, wherein the processor is further configured to perform operations comprising:

executing control in an order of the first control, the second control, the third control, and the fourth control until the state of power deficiency is eliminated.

6. A power supply control method, comprising:

determining a predicted level of supply power that will be provided by a power supply;

comparing the predicted level of supply power to an actual measurement value of power consumption of one or more servers;

determining, by a determination unit of a power control device, a difference between the predicted level of supply power and the actual measurement value based on the comparing; and changing, by a control unit of the power control device, a level of actual power consumption by the one or more servers based on the difference, wherein the level of actual power consumption is reduced when the difference indicates that the actual measurement value is greater than the predicted level of supply power, and the level of actual power consumption is increased when the difference indicates that the actual measurement value is less than the predicted level of supply power, so as to reduce the difference.

7. A non-transitory computer storage medium encoded with instructions that, when executed by one or more computers, cause the one or more computers to perform operations comprising:

determining a predicted level of supply power that will be provided by a power supply;

comparing the predicted level of supply power to an actual measurement value of power consumption of one or more servers;

determining a difference between the predicted level of supply power and the actual measurement value based on the comparing; and changing a level of actual power consumption by the one or more servers based on the difference, wherein the level of actual power consumption is reduced when the difference indicates that the actual measurement value is greater than the predicted level of supply power, and the level of actual power consumption is increased when the difference indicates that the actual measurement value is less than the predicted level of supply power, so as to reduce the difference.

\* \* \* \* \*